United States Patent
Moon

(10) Patent No.: US 11,265,325 B2
(45) Date of Patent: Mar. 1, 2022

(54) SYSTEMS AND METHODS OF SALUTATION PROTOCOL TO COMMUNICATE USING A PRIVATE OVERLAY PEER TO PEER NETWORK

(71) Applicant: Whitestar Communications, Inc., Apex, NC (US)

(72) Inventor: Billy Gayle Moon, Apex, NC (US)

(73) Assignee: Whitestar Communications, Inc., Durham, NC (US)

(*) Notice: Subject to any disclaimer, the term of this patent is extended or adjusted under 35 U.S.C. 154(b) by 230 days.

(21) Appl. No.: 16/518,292

(22) Filed: Jul. 22, 2019

(65) Prior Publication Data
US 2021/0029126 A1    Jan. 28, 2021

(51) Int. Cl.
H04L 29/06 (2006.01)
H04L 9/32 (2006.01)

(52) U.S. Cl.
CPC ............ H04L 63/102 (2013.01); H04L 9/321 (2013.01)

(58) Field of Classification Search
CPC ............................ H04L 63/102; H04L 9/321
See application file for complete search history.

(56) References Cited

U.S. PATENT DOCUMENTS

| | | | |
|---|---|---|---|
| 9,363,221 B1* | 6/2016 | Ozog | G06Q 30/0251 |
| 2003/0158960 A1* | 8/2003 | Engberg | G06Q 20/02 |
| | | | 709/237 |
| 2005/0198299 A1* | 9/2005 | Beck | H04L 67/00 |
| | | | 709/226 |
| 2006/0293034 A1* | 12/2006 | Armstrong | H04L 63/168 |
| | | | 455/414.1 |
| 2007/0140110 A1* | 6/2007 | Kaier | H04L 67/1059 |
| | | | 370/218 |
| 2010/0177699 A1* | 7/2010 | Klefter | H04L 61/1552 |
| | | | 370/328 |
| 2010/0262828 A1* | 10/2010 | Brown | H04L 63/061 |
| | | | 713/171 |

(Continued)

OTHER PUBLICATIONS

Dissenter, Frequently Asked Questions at https://dissenter.com/help/faq, Apr. 16, 2017.

(Continued)

*Primary Examiner* — Jason Chiang
(74) *Attorney, Agent, or Firm* — Devlin Law Firm LLC; Deepali Brahmbhatt

(57) ABSTRACT

The systems and methods of modeling a private network communication, comprising: associating a with a digital identity of a first profile; allowing access by other profiles with digital invitation only; optionally adding another profile to the blacklist by default when a request to communicate is initiated without a digital invitation; sharing the credentials after authentication of the digital invitation; receiving an encrypted digital relationship request from a second profile for the first profile with an embedded temporal key; decrypting the temporal key and a digital identity of the requestor; sending an authenticated response from the first profile and performing one of the following: adding the second profile to a whitelist and communicating with the second profile using a secure channel if it determined that the authenticated response signal acceptance; or adding the second profile on a blacklist when the request is not desired or fails verification.

16 Claims, 9 Drawing Sheets

(56) References Cited

U.S. PATENT DOCUMENTS

| | | | | |
|---|---|---|---|---|
| 2011/0113249 | A1* | 5/2011 | Gelbard | H04L 9/3236 |
| | | | | 713/170 |
| 2013/0091582 | A1* | 4/2013 | Chen | G06F 21/60 |
| | | | | 726/26 |
| 2013/0159715 | A1* | 6/2013 | Klassen | H04L 63/061 |
| | | | | 713/171 |
| 2013/0318589 | A1* | 11/2013 | Ford | H04L 63/0428 |
| | | | | 726/7 |
| 2014/0047560 | A1* | 2/2014 | Meyer | G06F 21/10 |
| | | | | 726/28 |
| 2014/0213309 | A1* | 7/2014 | Lazaridis | H04L 69/24 |
| | | | | 455/466 |

OTHER PUBLICATIONS https://www.web2pdfconvert.com/, 2018.
https://www.codester.com/items/13206/web2pdf-ios-source-code, 2018.
Zeroisation at https://en.wikipedia.org/wiki/Zeroisation, 2018.
IBM Az/OS Cryptographic Services, Integrated Cryptographic Service Facility, Application Programmer's Guide, p. 50, 2011.
FIPS PUB 140-2, May 25, 2001.
DIBS at https://github.com/emin63/dibs, 2014.
https://github.com/bernardobelchior/distributed-backup-service.
https://github.com/afonsocastro96/SDIS-Project2, 2016.
https://soueceforge.net/projects/p2pbackupsmile/, 2010.
http://www.infostor.com/nas/58-top-open-source-storage-project-1.html, Dec. 26, 2013.
CDN disclosed at https://en.wikipedia.org/wiki/Content delivery network, 2015.
BitTorrent Speed to Strengthen BitTorrent Protocol, Connect users with (BTT) tokens, McBrown, Jan. 17, 2019 at http://blog.bittorrent.com/2019/01/17/bittorrent-speed-to-strengthen-bittorrent-protocol-connect-users-with-btt-tokens/.

* cited by examiner

SYSTEMS AND METHODS OF SALUTATION PROTOCOL TO COMMUNICATE USING A PRIVATE OVERLAY PEER TO PEER NETWORK

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Whitestar Communications, Inc.'s concurrently filed patent applications are incorporated herein by reference: (1), titled "SYSTEMS AND METHODS OF SECURING DIGITAL CONVERSATIONS FOR ITS LIFE CYCLE AT SOURCE, DURING TRANSIT AND AT DESTINATION"; (2), titled "SYSTEMS AND METHODS OF COLLABORATIVE APPLICATION ON A PRIVATE NETWORK"; (3), titled "SYSTEMS AND METHODS OF ENFORCING COMMUNICATIONS SEMANTICS ON A PRIVATE NETWORK"; (4), titled "SYSTEMS AND METHODS OF GESTURE TRIGGERED AUTOMATIC ERASURE ON A PRIVATE NETWORK"; (5), titled "SYSTEMS AND METHODS OF DISTRIBUTED BACKUP AND RECOVERY ON A PRIVATE NETWORK"; and (6), titled "SYSTEMS AND METHODS OF DELEGATION OR REPLICATION ON A PRIVATE NETWORK."

FIELD OF THE INVENTION

The present invention is in the technical field of establishing and controlling conversations in social media with the use of secure and encrypted private networks. More particularly, the present invention is in the technical field of facilitating introductions and establishing different levels of relationships. More particularly, the present invention is in the technical field of establishing a simple and straightforward de-centralized and flat hierarchy of different types and categories of computing devices including establishing equal access and rights to a personal computer as well as an internet of things device.

BACKGROUND

Social media typically facilitates user-generated content including text, comments, photos, videos and voice. Traditionally these various media are generated through "online" interactions and are facilitated by one or more third party platforms such as Twitter, Facebook, Youtube, SnapChat, Instagram, Weibo, LinkedIn and many others.

In traditional social media systems, users create profiles via a service providers website or app and all the content is maintained, processed and stored by the social media company. Users of each system can "discover" each other through extensive online directories or via a direct invitation from one user to another.

While users don't pay "directly" for use of these services, the services providers generate revenue from their users content and meta data through directed ads and selling access to their subscribers content for data mining or harvesting. This revenue then offsets the cost of maintaining the centralized servers and data centers and in some cases returns dividends to their shareholders.

Unfortunately, there are a number of serious drawbacks to this architecture. Most notably is the broken business model that requires the service provider to monetize their customers, which in turn requires their customers to give some, if not all of their privacy.

Additionally, the service provides have recently gone into censorship or "de-platforming" of content based on their or their advertisers best interests and not necessary the interest of their users or user communities. In some cases the censorship is at the direction of a central government but in most cases it is carried out based on arbitrary decisions of the social media service provides.

Complicating the matter, should a competitor wish to enter the market to compete against the entrenched social media companies it takes tremendous capital to build out the data centers and facilities to onboard even a single user. As users join the new network, more resources must be added to the central networks to manage the traffic load and to store the content being created by their users. At the end of the day, the new social media company would once again have to monetize their customer base, solicit advertisers and adhere to government oversight. While the new company might impose a different set of censorship policies than the legacy companies its still censorship by a third party and not by end users. In summary, the current architecture of social media tends to lead to: (i) Third party censorship, sometimes legally, sometimes not; (ii) Lack of Privacy either on purpose or by accidental exposure; and (iii) Lack of free association.

The last point, lack of free association can best be understood by the fact that the social media companies can and do decide what user can and can not participate in their platform. Worse is that while excluding one user A from freely joining a given community and conversing with members of that community, the same platform may allow other members to make almost any claim about user A without allowing user A the ability to refute those claims. This leads to very bad social norms in which gangs of denizens roam from social media site to social media site spreading false or unsubstantiated claims about user A without user A being able to defend herself on any of those platforms.

Furthermore, because the user's content is held by a third party and the social media companies routinely change their terms of services, most users are unaware that their content may be retained or archived, indefinite. A frivolous statement which is deemed "social acceptable today" may be judged years into the future by a new set of standards and lead to harsh consequences including ability to get into schools and colleges, ability to get a job, ability to run for public office, etc. We call this effect "Future Guilt."

Still further problems exist in the semantics of existing social interactions on social media sites. When someone creates content, they don't "own" that content, the social media company does. Even with as simple as email, "ownership" of content is fluid and the semantics of "polite" conversation are not a part of the system.

For example, if user A creates an email message and sends it to user B and in that email, user A included content that she did not want to disclose to anyone else, there is nothing in the art that would prevent user B from saving that information away, copying it or forwarding it to someone else like user C. Neither is user B prevented from replying to user A and copying additional users D, E, etc. on that reply. This sort of "lack of control" of content is pervasive in today's social media systems and this leads to a lack of polite discourse amongst members of society.

With the explosion of Internet of Things (IoT) devices, the number of devices connecting on the internet are exploding. It is unreasonable to expect any single device, for example, to have equal probability of connecting with another IoT device next to it or a personal computer remotely located in Mongolia. The current internet and networked communication do not align to the way society or human behavior operates. There are no digital equivalents that promotes good behavior in a digital or online environment that are cultivated based on existing social norms.

The current public networks assume uniform packet distribution that cannot be converged. Security is also an issue because any computing device can send a packet to any other device. The approaches to resolve digital spam including email or text spam are based on prevention and not fixing the root cause of the problem, i.e. openness of receiving packets from unauthenticated senders.

SUMMARY OF THE INVENTION

The present invention is systems and methods of modeling a private network communication, comprising: associating a secure and encrypted private network with a digital identity of a first profile; allowing access to the private network by other profiles with digital invitation only; optionally adding another profile to the blacklist by default when a request to communicate is initiated without a digital invitation; sharing the private network communication credentials after authentication of the digital invitation; receiving an encrypted digital relationship request from a second profile for the first profile through the private network communication with an embedded temporal key; decrypting the temporal key and a digital identity of the requestor; sending an authenticated response from the first profile on the digital relationship request and performing one of the following: adding the second profile to a whitelist and communicating with the second profile using a secure channel on the private network if it determined that the authenticated response signal acceptance; or adding the second profile on a blacklist if it is determined that the request is not desired or fails verification.

The systems and methods of modeling a private network communication, wherein the digital invitation includes signet of the first profile that is shared using one or more of the following: a business card, a posting on a website, broadcast on a public channel, shared with a private group at an event, shared on a social blog, exchanged by email, or digital information transfer.

The systems and methods of modeling a private network communication, wherein the signet includes: embedded information to get one or more of the following: an alias, a public key, a network address, or a phone number; comprises of one or more of the following codes to contain the embedded information: a Quick Response Code, a bar code, a radio frequency identification tag, authentication code using public key, a near field communication code or a digital code; and comprises of one or more of the following formats to encode the embedded information: binary using type-length-value, concise binary object representation, javascript object notation, eXtensible Markup Language or key/value pairs.

The systems and methods of modeling a private network communication, wherein the acceptance types include one or more of the following: permanent acceptance, transient acceptance based on geographic location, transient acceptance expiring with a lapse of a time period.

The systems and methods of modeling a private network communication, wherein the digital invitation is made public to all.

The systems and methods of modeling a private network communication, further comprising: sending the digital invitation using an out of band network channel.

The systems and methods of modeling a private network communication, further comprising: establishing the private network as an overlay network on an existing public network, or establishing the private network as an overlay peer to peer network.

The systems and methods of modeling a private network communication, wherein the secure channel with the second profile does not include a server intermediary.

The systems and methods of modeling a private network communication, wherein the first profile digitally resides on a computing device including one or more of the following: a personal computer, tablet, laptop, handheld device, smart device, or internet of things device.

The systems and methods of modeling a private network communication, further comprising: sharing the whitelist or portions of the whitelist with another profile.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
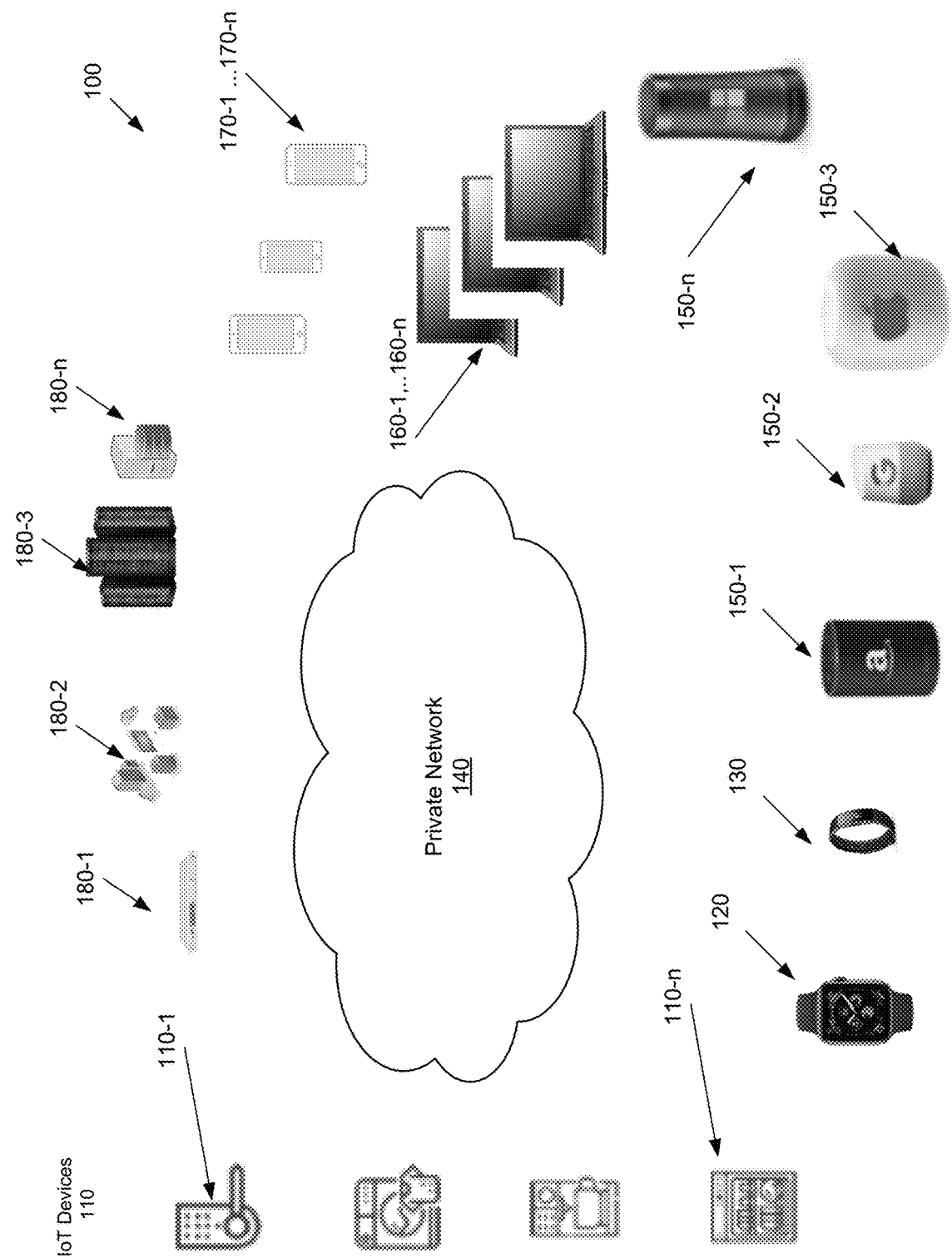
FIG. 1 shows a diagram illustrating an example of a system and method of modeling a private network with different types and categories of computing devices including internet of things devices.

The systems and methods of modeling a private network with a standardized introduction or salutation protocol to establish increasing or decreasing levels of trust in a relationship between two profiles. One of the keys to address the problems with today's social media is to provide for an alternative mechanism for users to freely associate. If users must rely on a central authority, or third party, to discover one another and who may or may not allow users to join their platform, then they are unable to freely associate with one another.

The systems and methods of modeling a private network provides for a completely distributed social media platform that allows both humans and machines to freely associate with one another through a special salutation protocol. In this platform, there is no central service. There is no cost to stand up the platform. There are no additional costs as each new user joins the social network. Instead of a central services storing user content and facilitating user content distribution and user discover, all these facilities are provided in a peer to peer social network by the users themselves.

No central authority can prevent the users from freely associating with one another or can exclude a given user from participation in social media with this system.

The systems and methods of modeling a private network, allows free association between user A and user B as follows. if user A wishes to associate with user B, then user A would send a special salutation message to user B introducing himself to user B and requesting permission to association with him.

This request is sent from user A to user B directly, without the aid of a centralized social media company. In our preferred embodiment, this interaction would be carried out via a specialized text message sent via MMS, SMS, or similar. Salutation addressing would simply be by phone number. User A would know the phone number of user B. User A would, through a custom application, send a salutation request to user B via text messaging to user B's cellular phone number.

Now when user B receives this invitation, a second application resident on user B's cellular device would receive this specially coded message, extract the salutation and in one embodiment, would present user B the option of accepting or rejecting the salutation sent from user A. Still in other embodiments, the acceptance or rejection could be automated and not require the interaction of user B.

Further, other transport means might be utilized other than SMS, MMS or text messaging between the devices. For example, IP addresses could be used to send a direct packet or message stream from one user A to another user B.

Now, should user B accept the salutation sent from user A, then that message would contain within it one or more IP addresses that user B can use to send a response to user A. At this point, user B would send an accept message to user A by sending user A a special message. In that message, user B would include, amongst other things, certain crypto graphic information necessary to authenticate user B and to encrypt messages that are sent to user B as well as one or more IP addresses that user A can use to send messages to user B.

At this point then, User A would send an encrypted message to user B also containing, amongst other things, certain crypto graphic information necessary to authenticate user A and to encrypt messages that are sent to user A.

Each party now has the ability to send information to the other party, directly, peer to peer via the counter parties IP address, again without the aid of a central service.

While the salutation protocol embodies the means by which users may freely associate, the system also provides for a means by which they dissolve their association as well. For in a polite society, we must have a well-defined mechanism for dissolving free associations when either party wishes to do so.

In our system, if user A, having received endpoint information about user B and therefore having the ability both send and receive information to and from user B, decides to dissolve their association, user A merely has to remove user B from her application. Upon doing so, a special message is sent to user B informing user B that user A no longer wishes to associate with user B at which point user B's application automatically removes user A's endpoint information from user B's device just as user A's application automatically removes user B's information from user A's device. This "tit-for-tat" mechanism assures that any party that is in free association with any other party, may at their discretion dissolve that association and that no further discourse can be had between the parties unless and until they repeat the salutation process.

Hence, in our system, free association and proper association controls are in the hands of the users of the system. There is no central authority governing such behaviors.

In our preferred embodiment, salutation acceptance messages and messages to dissolve associations are sent via TCP/IP, but many other protocols such as UDP or message busses or even SMS/MMS may also be used.

The information contained within an endpoint message is held in a special object. That object contains at least the following information: (i) One or more network addresses that may be used to communicate with the endpoint—in other words an address that that endpoint is willing and able to receive further messages at. (ii) The public key of a public/private key pair to be used for cryptographic purposes. (iii) An alias that is associated with the public/private key pair. The alias is any monotonically incrementing number such that each new instance of public/private key pairs has a higher value than the previous key pairs. (iv) A collection of zero or more conversation ID's that have been created by the endpoint. (v) An endpoint ID. The endpoint ID is unique in the entire world and does not require coordination to achieve uniqueness. In our preferred embodiment, the endpoint ID is based on a UUID as defined by the IETF. (vi) A time stamp that indicates when the endpoint object was first created. (vii) A time stamp that indicates the last time the endpoint object was updated. (viii) An arbitrary array of content that is base 8 binary format (aka, a byte array) of zero or more bytes of content associated with the endpoint. In our preferred embodiment, this content is an HTTP encoded document that when rendered will create a hypertext document.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of securely connecting computing devices through the private network. In the example of FIG. 1, the environment includes a first IoT devices 110-1 through an nth client system 110-n, private network 140, a smart watch 120, a fitness tracker 130, intelligent voice assistants 150-1 to 150-n, personal computers from 160-1, . . . 160-n, smartphones from 170-1 to 170-n, servers from 180-1, . . . 180-n.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to communicate with the private network system to enable receipt and execution of speech commands translated to device specific SDK/API commands.

The role of the computing device manufacturers is separated from the use of the computing devices. After purchase, a user of the computing device has control on how to use, configure and communicate using that device. Use of any central services including those from the device manufacturer become optional. In one embodiment, there are one or more aliases associated with each of the computing devices including the IoT devices. The IoT devices integrate with the private network with zero additional programming. Different categories of smart watches 120, fitness trackers 130, personal computers 160 are connected securely and with encryption. The Intelligent voice assistants 150 can be from a variety of providers like Amazon Alexa, Google Home Assistant, Apple HomePod, Microsoft Cortana etc. Smartphones 170 and servers 180 with more computing power, bandwidth and capabilities are also connected. For example, the smallest computing device, i.e. an IoT doorbell ring to the largest computing device, a full-fledged server, are both treated equal in the digital private network world.

A user profile may be associated with one or more aliases. The smallest building brick for the private network is an alias. With the evolution of smarter devices and use of artificial intelligence, an alias may be given the capability to automate and make some of its own decisions. By default communication occurs only with devices that you choose too and not with any random device on a public network or the internet.

In one embodiment, a single alias is associated with a single computing device. A user or owner has access to the private key associated with the public/private key for that alias. For devices that are co-owned, two or more user profiles may have access to the same alias profile. In one embodiment, a private network is associated with all aliases that a user owns.

A person of ordinary skill in the art would appreciate that by assigning an alias to a computing device that operates independent of a user profile, the private network operates by authenticating each computing device on its network. Authentication is not based on user password or related parameters associated with a user that can be used on more than one device. A user owning more than one computing device, authenticates each device separately using its own associated alias. Authenticating at the device level, enables better control of access on the private network.

Computing devices irrespective of their size, category or applications have powerful computing capabilities in terms of processing power and also have network bandwidth to connect. The systems and methods of modeling private network allow for these computing devices to connect seamless in a secure and encrypted manner after authentication. Each transaction is an authenticated exchange. Such exchanges eliminate spam. An unwanted sender is revoked from the whitelist of authenticated senders and cannot send spam.

In one embodiment, by default the computing devices connect only after establishment of a trusted relationship through the salutation protocol. In one embodiment, the computing device can accept public network connections but periodically go into private network mode that are secured and authenticated. This would be equivalent to going into a mute mode when distractions are not needed from strangers that are not already trusted.

In one embodiment, any profile that is not authorized to be on the whitelist is by default on the blacklist and denied access to secure channel communications. In one embodiment, relationship between two profiles can transition from untrusted stranger, trusted transient relationship based on attending an event or conference i.e. triggered for a time period or triggered by proximity to a location, permanent trusted, revoked to blacklist.

In one embodiment, the salutation protocol is used in a discovery mode when different aliases are open to accepting requests for relationships. Discovery mode allows two devices associated with two different aliases to exchange messages in accordance with the salutation protocol described herein and subsequently established a secure channel for communications.

In one embodiment, the salutation protocol creates relationship tables for a given alias that can be forwarded to other trusted aliases, i.e., for example, aliases that are owned by your roommate, wife or partner. A user can customize whether to forward all or portions of relationship tables from one of his aliases.

In one scenario, an owner of a house may have setup a relationship table with all the internet of things devices in his home. After a sale or rent of his house, the owner may forward that portion of the relationship table to the new owner or tenant giving or transferring rights to access those devices. If the devices are sold, the previous owner can delete those relationships from his own aliases after transferring them to the new owner.

A person of ordinary skill in the art would appreciate that two aliases communicating with each other have equal rights and access. Both the aliases require permission with each other to enter into a relationship and start a conversation through a secure channel. Either one of the aliases can decide to terminate the relationship and revoke the established trust. These exchanges mirror the scenarios of communication in real life.

Private Network 140 can be different wireless and wired networks available to connect different computer devices including client and server systems. In an implementation, private network 140 is publicly accessible on the internet through salutation protocol described herein. In an implementation, private network 140 is inside a secure corporate wide area network. In an implementation, private network 140 allows connectivity of different systems and devices using a computer-readable medium.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, RSA, Advanced Encryption Standard (AES) or other methods known in the industry.

Figure 2:
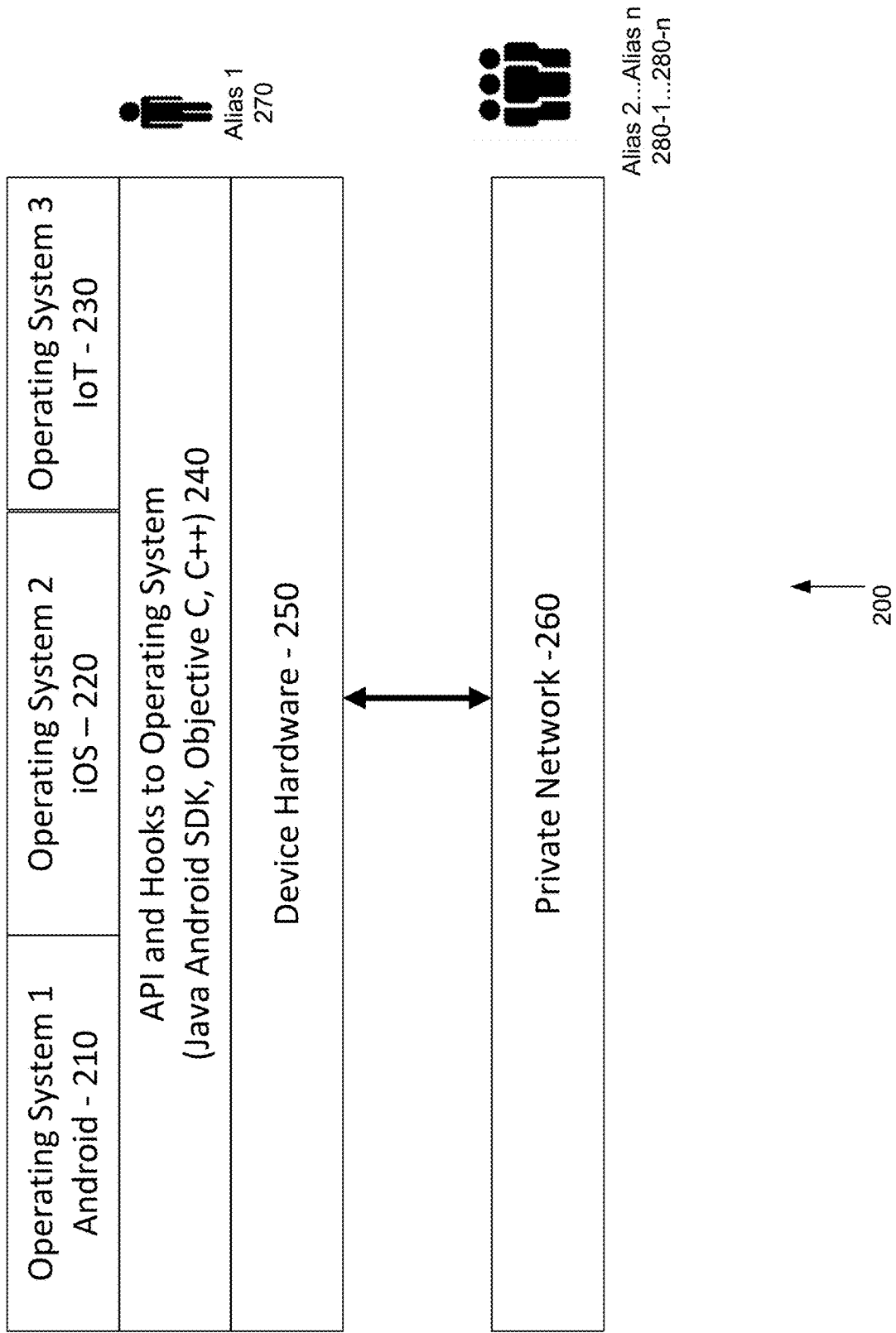
FIG. 2 shows an exploded view of a computing device with overlay network, according to one embodiment.

FIG. 2 is an exploded view 200 of different versions of an implementation that allow application programming interface, hooks, or overlay network connections in a computing device. For example, Alias-1 270 is associated with a computing device that may have one or more operating systems including Android 210, iOS 220 or IoT operating system 230. The computing device includes device hardware 250 that can be controlled by the private network API/hooks 240 that are incorporated at a system level on the computing device. In one embodiment, depending on the computing device platform the private network overlay hooks are implemented using Java Android SDK, Objective C, or C++. In one embodiment, any and all communications are controlled using the private network overlay architecture. In one embodiment, a user can customize the alias to go in and out of the private network overlay architecture mode. The private network 260 includes other trusted alias 2 to alias n i.e. 280-1 to 280-n all of which can communicate with Alias-1 using authenticated, secure and encrypted channels. In one embodiment, the overlay network is based on peer to peer network. In one embodiment, the private network using an overlay network using the existing public network.

Figure 3:
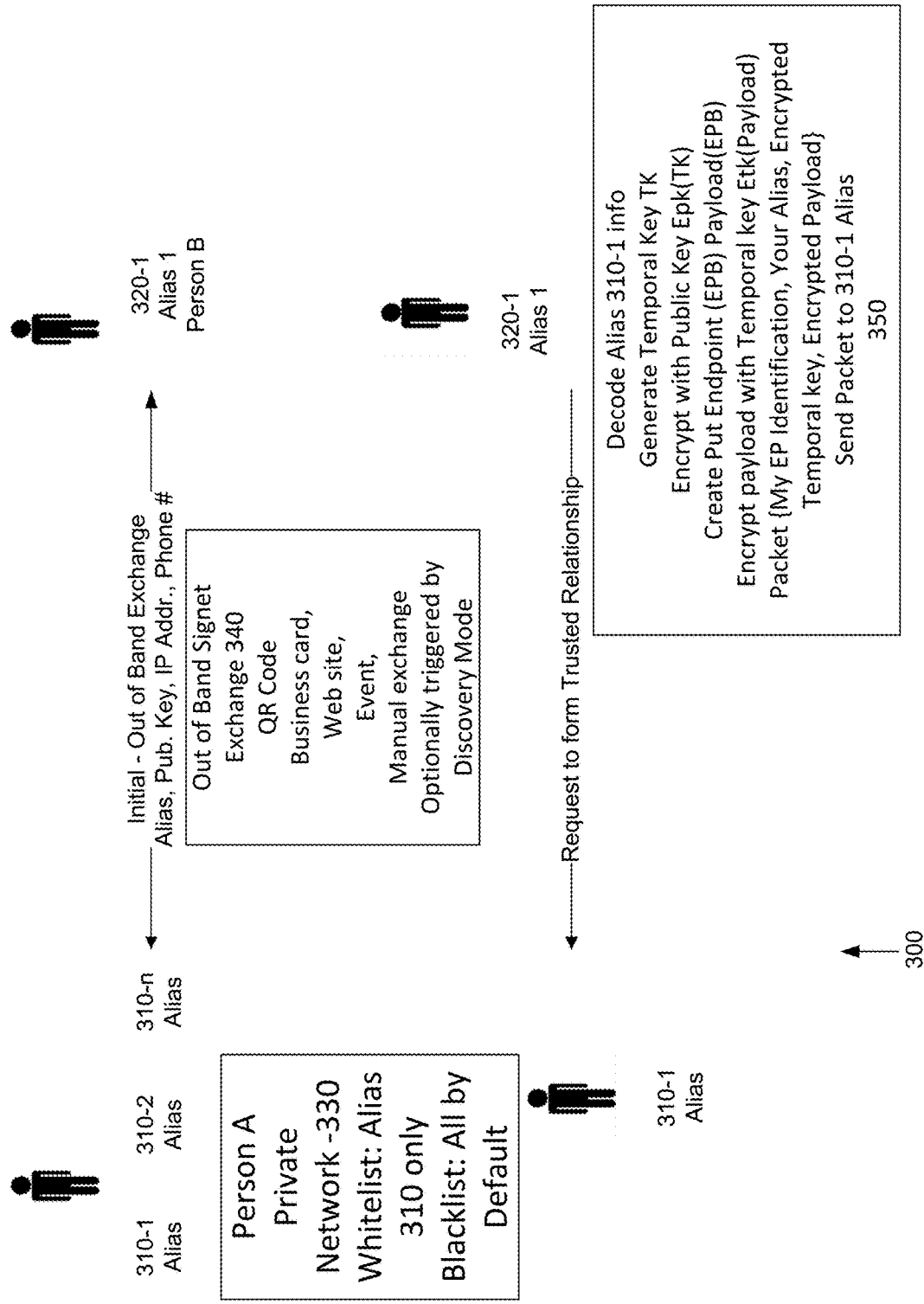
FIG. 3 is an exploded view of initial salutation protocol out of band messaging and response, according to one embodiment.

FIG. 3 outlines 300 the first stage of the salutation protocol to establish a trusted relationship between two aliases. Here, two persons Person A and Person B are strangers to begin with. Alias 310-1, . . . 310-n are owned by Person A. Alias 320-1 is owned by Person B. The profile associated with any alias includes an alias, public key, network address, for example, an ip address and a phone number. The initial profile details are exchanged out of band between Alias 1 and Alias 2 310-1. This could mirror real-life situations where person A and person B meet for the first time at a coffee shop, in a bar, at an office meeting, at an event or a conference and exchange business cards. The business card includes the profile details in a signet 340 for one of the aliases. Each alias has a relationship table for the private network that includes one or more whitelists and one or more blacklists.

In one embodiment, the out of band exchange occurs using a posting on a website, broadcast on a public channel, shared with a private group at an event, shared on a social blog, exchanged by email, or digital information transfer. In one embodiment, the out of band exchange is triggered by a discovery mode. In one embodiment, all the computing devices go into discovery mode on push of a button or holding of the reset button, on first instance of power up or each time a new network is detected. In one embodiment, there is bulk provisioning of the relationship tables that include one or more of the whitelists and blacklists. In one embodiment, one or more of the whitelists or portions of the whitelists, blacklists or portions of the blacklists can be shared with another trusted alias. In one embodiment, the signet includes embedded information to get one or more of the following: an alias, a public key, a network address, or a phone number. The signet comprises of one or more of the following codes to contain the embedded information: a Quick Response Code, a bar code, a radio frequency identification tag, authentication code using public key, a near field communication code or a digital code. The signet comprises of one or more of the following formats to encode the embedded information: binary using type-length-value, concise binary object representation, javascript object notation, eXtensible Markup Language or key/value pairs.

In one embodiment, the signet is made public to all. For example, the signet may be associated with providing a service to all or selling a product. One way of marketing with the use of the private networks is to make the signet publicly available to all for a selected topic of conversation, i.e. sell of a product or a service. In one embodiment, the signet is sent using an out of band channel, i.e. similar to a vcard attachment to an email message or a text message that does not use the private network.

Aliases 310-1, . . . 310-n form a private network 330 that is not accessible by Alias 320-1 yet. Private Network 330 allows only whitelist members from the relationship table that currently include all Alias 310-1 to 310-n. Alias 320-1 is absent from the whitelist and hence is effectively on the blacklist by default.

Alias 320-1 sends a request to form a trusted relationship to Alias 310-1 after decoding the signet 340 received out of band. The request 350 includes decoding alias 310-1 information, generating temporal key Tk, Encrypting with public key Epk (Tk), create endpoint payload (EPB) Payload (EPB), encrypt payload with temporal key Etk (Payload). This allows a packet that includes {My Endpoint Identification, Your Alias, Encrypted Temporal Key, Encrypted Payload}. The packet is then sent to Alias 310-1.

A person of ordinary skill in the art would understand that it is not possible to create the packet to request to form a trusted relationship without having access to the profile details in the signet. A person cannot communicate with another person without an initial out of band exchange that discloses his public key. The digital signet information may be encoded in a QR Code, a bar code, a radio frequency identification tag, authentication code using public key, a near field communication code or a digital code. Only after receipt and decoding this initial information, can the initial packet be sent.

A person of ordinary skill in the art would understand that a person may create a signet with alias information including public key that expires after a certain period of time. A person may be able to restrict access by changing the digital signet periodically. This allows customized control where only fresh relationships can make the request and expired relationships cannot renew.

A person has full control on what he or she receives at a given time from any application, any server or anywhere at any given time. There is no need to customize filters or access rights on different servers or applications. In one embodiment, all of the services and applications are accessed only through the private network overlay as described herein.

Figure 4:
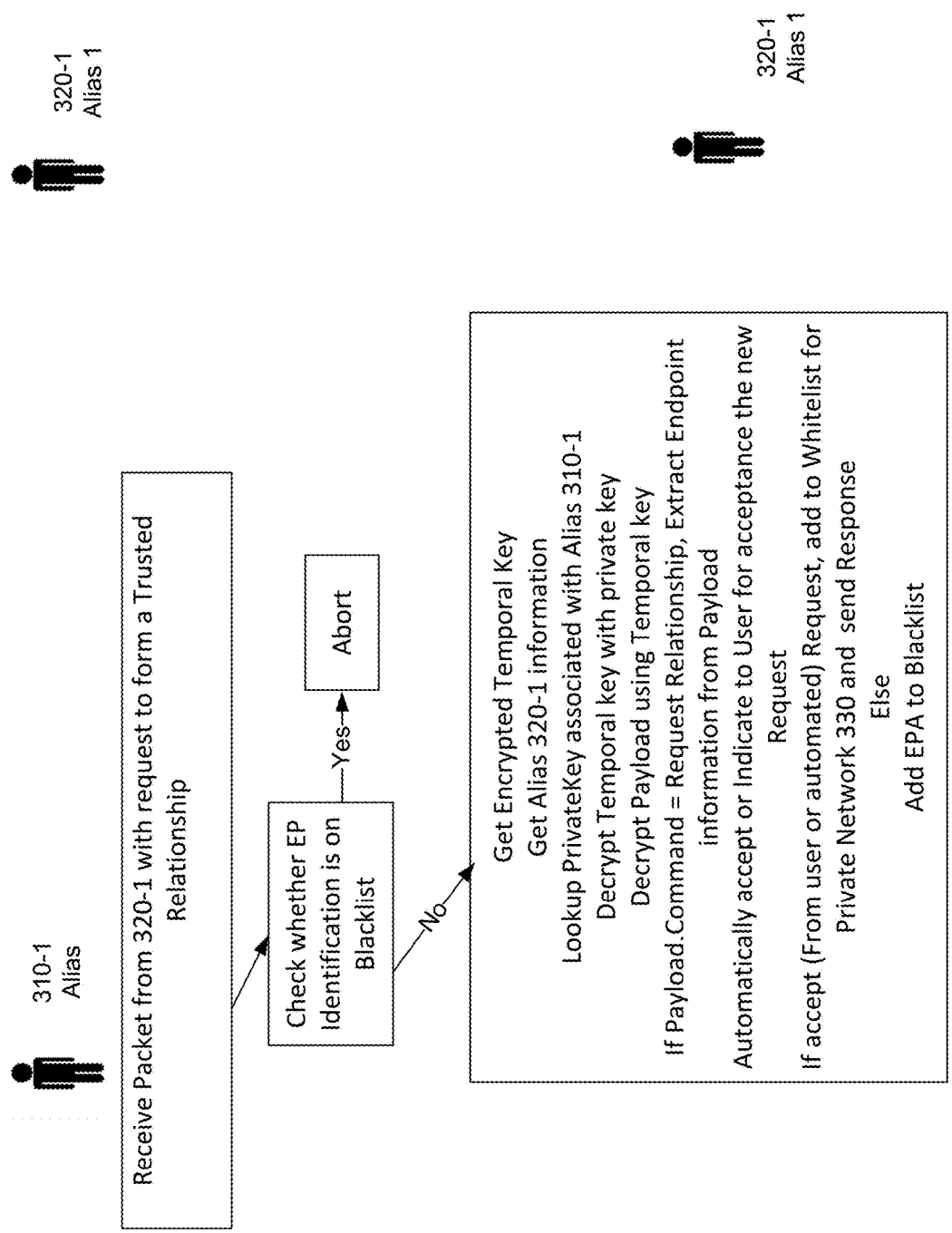
FIG. 4 is an exploded view of second stage of messaging in a salutation protocol, according to one embodiment.

FIG. 4 with 400 shows second stage of the salutation protocol that follows FIG. 3. Alias 310-1 has now received a packet from Alias 320-1. The packet includes a request to form a trusted relationship. An initial check is done to determine whether the packet sender is on blacklist. If he is already on a blacklist, i.e. if he is listed on blacklist explicitly and not on blacklist by default of not being on the whitelist, then the packet aborts and no response is sent back.

If he is not listed on the blacklist, the packet is decrypted to get Encrypted Temporal Key, get Alias 320-1 information, lookup PrivateKey associated with Alias 310-1, decrypt Temporal key with private key, decrypt Payload using Temporal key. If Payload.Command=Request Relationship, Extract Endpoint information from Payload, automatically accept or Indicate to User for acceptance the new Request. If accept (From user or automated) Request, add to whitelist for Private Network 330 and send Response, else add Endpoint-A (EPA) to blacklist.

Figure 5:
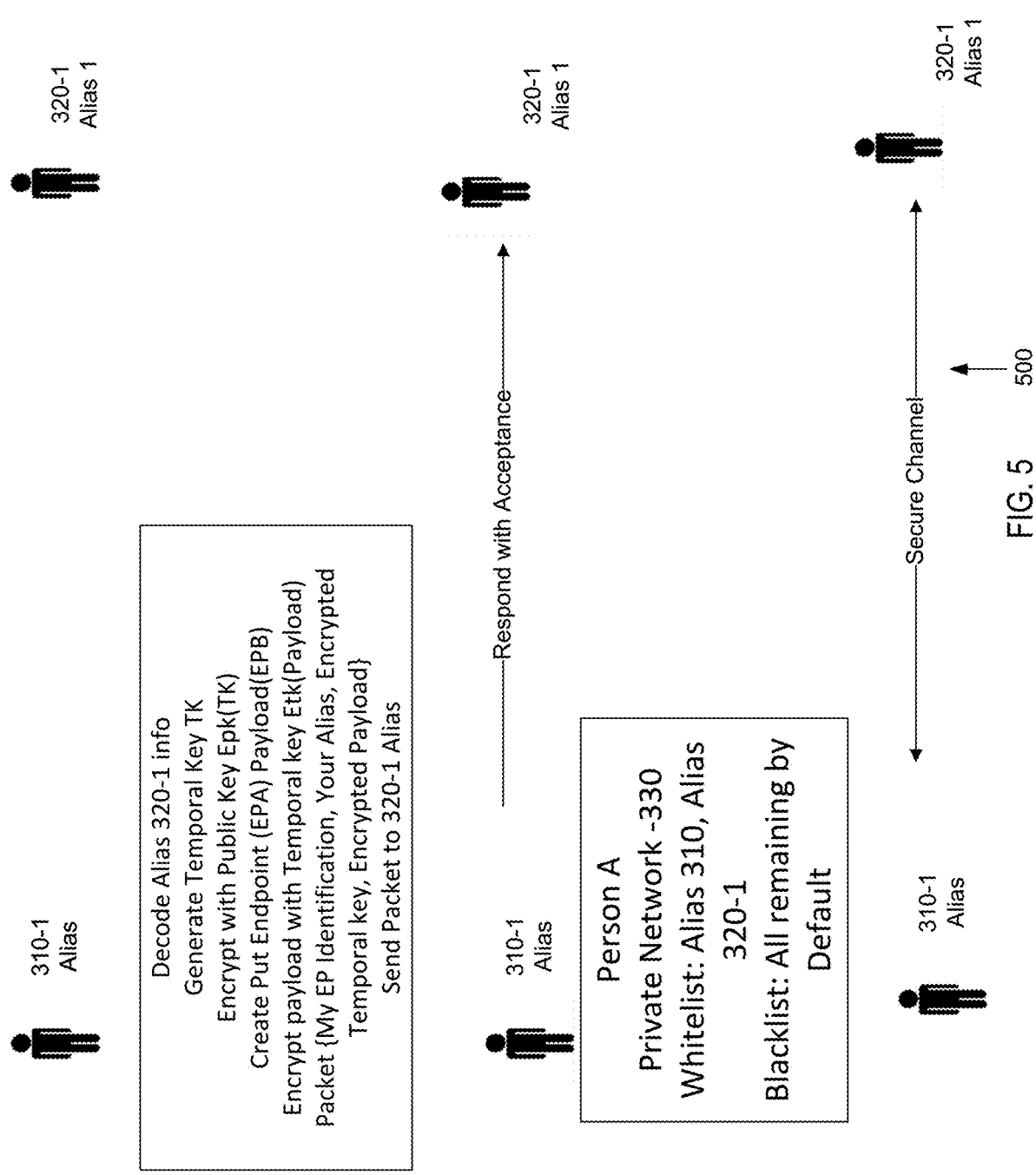
FIG. 5 is an exploded view of the third and final stage of messaging in a salutation protocol, according to one embodiment.

FIG. 5 with 500 shows the final stage of the salutation protocol that follows FIG. 4 to establish secure channel of communication to the private network 330. 310-1 Alias does the following steps: decode Alias 320-1 information, generate Temporal Key TK, encrypt with Public Key Epk (TK), create Put Endpoint (EPA) Payload (EPB), encrypt payload with Temporal key Etk (Payload), Packet {My EP Identification, Your Alias, Encrypted Temporal key, Encrypted Payload}. The packet is then sent to 320-1 Alias.

When the response is with acceptance, Endpoint A adds Endpoint B on the white list and vice versa. The private network 330's whitelist now includes all 310 aliases and 320-1 Alias. All others remaining by default are on the blacklist.

310-1 Alias and 320-1 Alias can now establish a secure channel and start communicating with encrypted messages.

The communication may now include higher level application protocols, including, for example, using Hyper-Text Transport Protocol ("HTTP"), Hyper-Text Transport Protocol Secure ("HTTPS") or Message Queuing Telemetry Transport ("MQTT") protocols. The device communication is encrypted using overlay Transport commands that include Transport control protocol ("TCP"), Web Sockets, MQTT or Constrained Application Protocol ("CoAP").

Figure 6:
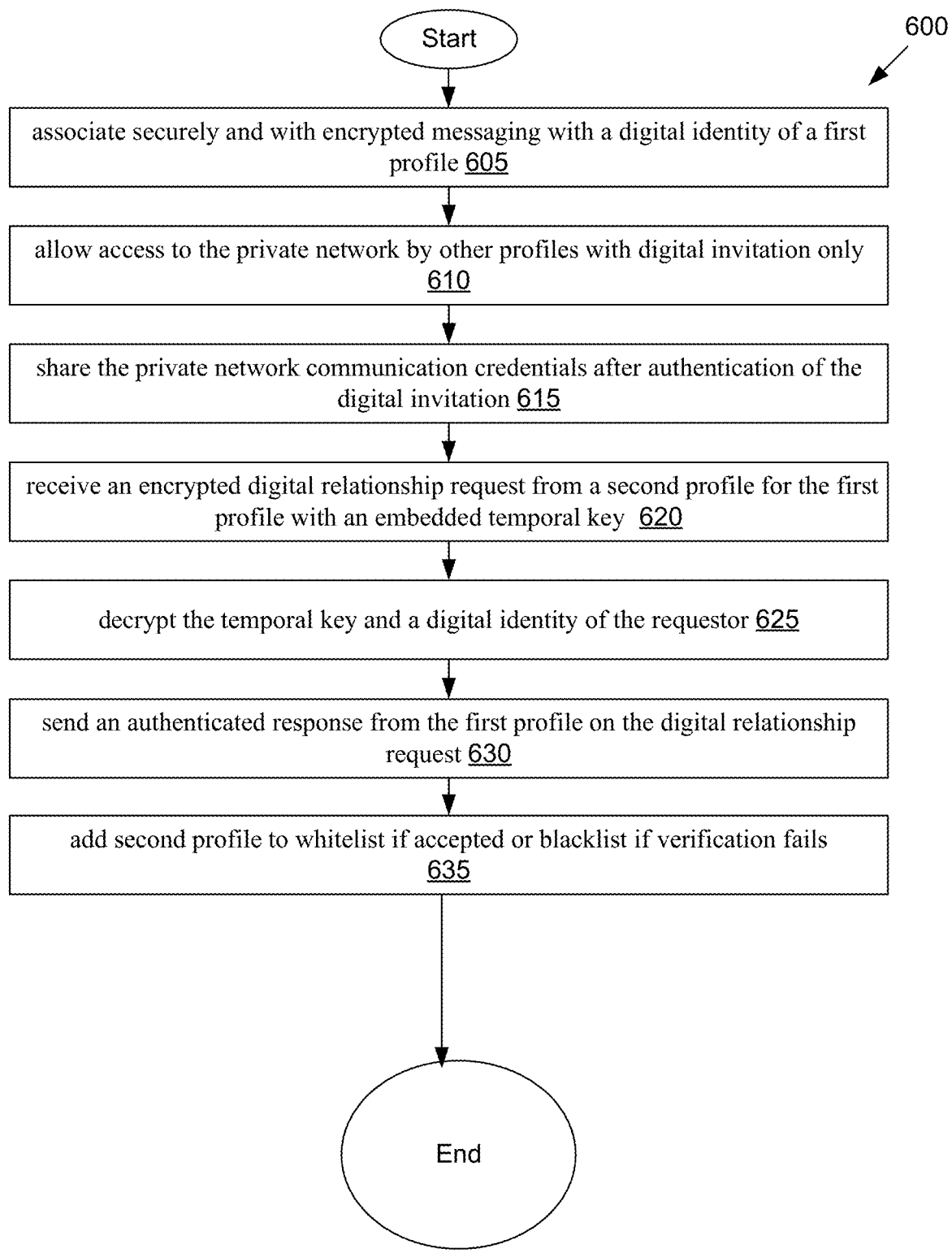
FIG. 6 shows a flowchart illustrating an example of a method of a salutation protocol.

FIG. 6 depicts a flowchart 600 illustrating an example of a method for a private network modeling. The flowchart 600 is discussed in conjunction with the environment shown in the diagram 100 in FIG. 1. At block 605, begins with associating securely and with encrypted messaging with a digital identity of a first profile. At block 610, allow access to the private network by other profiles with digital invitation only. In one embodiment, optionally adding another profile to the blacklist by default when a request to communicate is initiated without a digital invitation. At block 615, share the private network communication credentials after authentication of the digital invitation. At block 620, receive an encrypted digital relationship request from a second profile for the first profile with an embedded temporal key 620. At block 625, decrypt the temporal key and a digital identity of the requestor. At block 630, send an authenticated response from the first profile on the digital relationship request. At block 635, add second profile to whitelist if accepted or blacklist if verification fails.

In one embodiment, the digital invitation includes signet of the first profile that is shared using one or more of the following: a business card, a posting on a website, broadcast on a public channel, shared with a private group at an event, shared on a social blog, exchanged by email, or digital information transfer. For example, a coffee shop may have a signet that is based on geographic proximity depending on when the users are in the coffee shop. Such a signet would expire when there is no geographic proximity. In another example, a conference host may have a signet that expires at the end of the conference. Attendees attending the conference may freely use the signet while at the conference.

In a broad embodiment, the invention is systems and methods of a private network modeling allow controlled, flexible and customized communications that are secure and encrypted between one or more computing devices that are independent of any public networks or third-party applications or servers. Each alias associated with a computing device establishes a relationship table based on other trusted devices.

Figure 7:
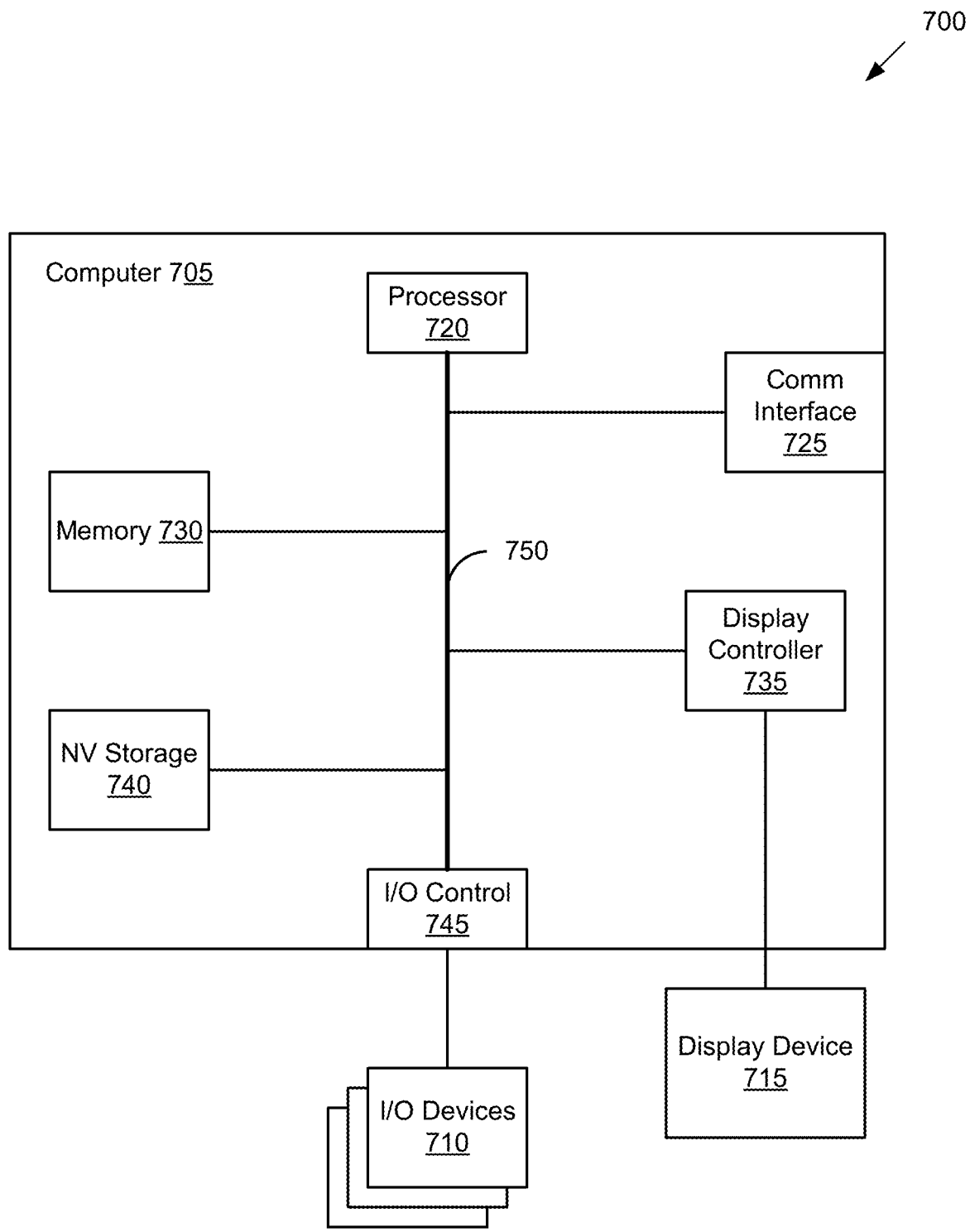
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 8:
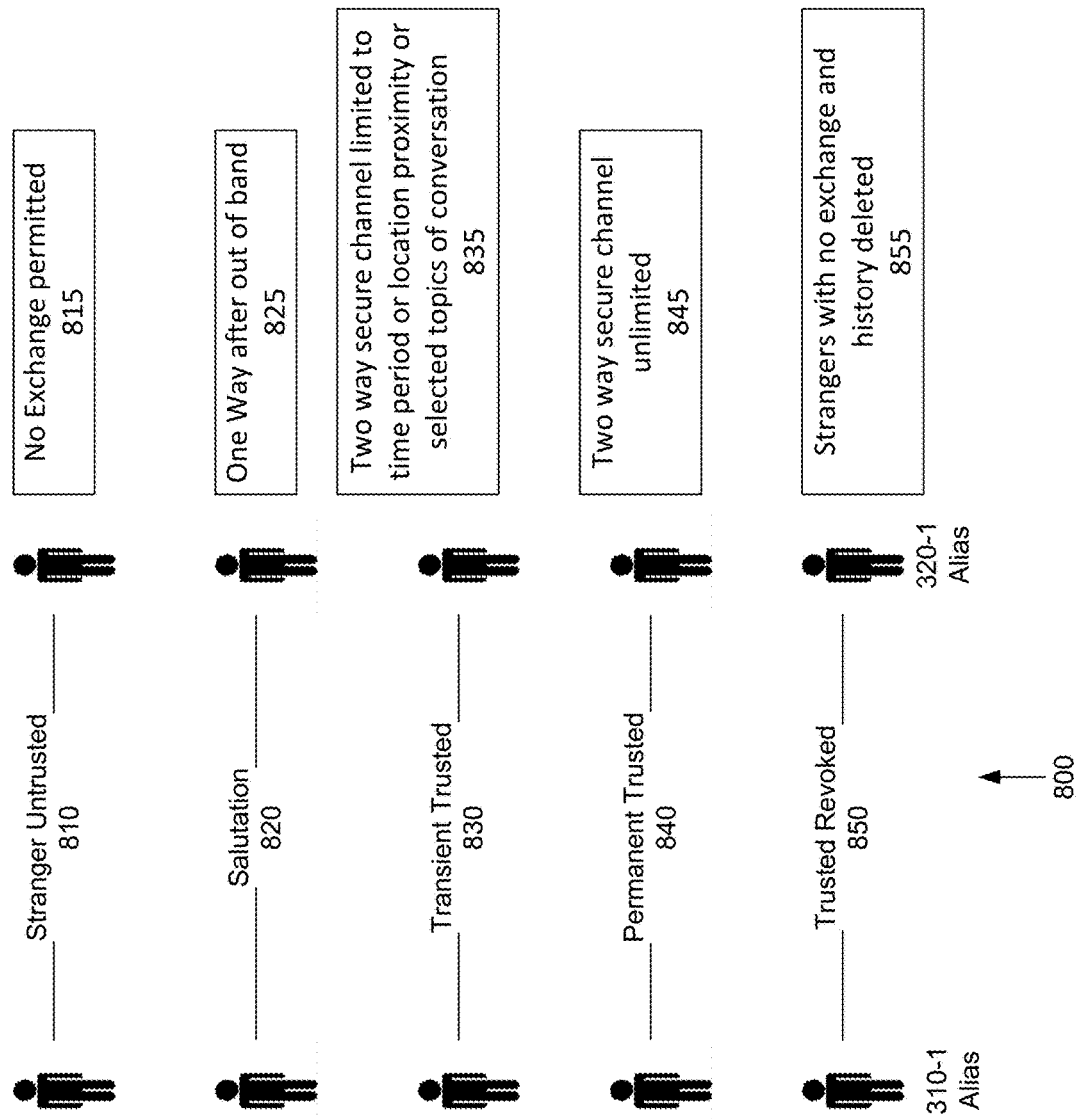
FIG. 8 is a staged level diagram illustrating different types of stages in a relationship between two profiles and the corresponding parameters of communication.

FIG. 8 shows different stages in a relationship between two aliases. To begin with a private network with Alias 310-1 whitelist would include all of the devices owned by user of Alias 310-1. By default everyone else is an untrusted stranger. When by default you are on the blacklist, 810 stranger untrusted mode does not allow communication 815 between Alias 320-1 and Alias 310-1. Users of Alias 310-1 may meet User of Alias 320-1 and exchange out of band salutation signet or digital information. Either one of the them can then initiate salutation protocol to establish a relationship between their two aliases. The initiation and exchange of the salutation protocol 825 occurs only after an initial exchange out of band of the signet including digital information. This is equivalent of meeting a new person in real life and exchanging their contact information, i.e. business card etc.

After the salutation protocol, the alias can be added on a whitelist of a private network for a transient time period, transient geographic proximity or permanently trusted period that does not expire, or transient acceptance based on selected topics of a conversation. When in a transient trusted 830 period, the aliases can communicate two way secure channel 835. In one embodiment, a transient trusted relationship could be based on topics of the conversation. For example, an alias 320-1 can accept all conversations originating from alias 310-1 when on selected topics of sports, politics etc. For example, a sports figure can accept conversations from fans related to sports but declines to discuss any personal topics or political unrelated news.

A permanent trusted 840 relationship allows unlimited conversations on unlimited topics for an unlimited period of time irrespective of the geographic location. This is equivalent of having a permanent trusted relationship with members of your family and close friends. As in a real-life situation, any relationship may be revoked by either alias. When trusted relationship is revoked 850, all history between the two aliases is deleted and both are again placed back at the top of the chart, i.e. in an untrusted relationship and stranger status to each other.

Figure 9:
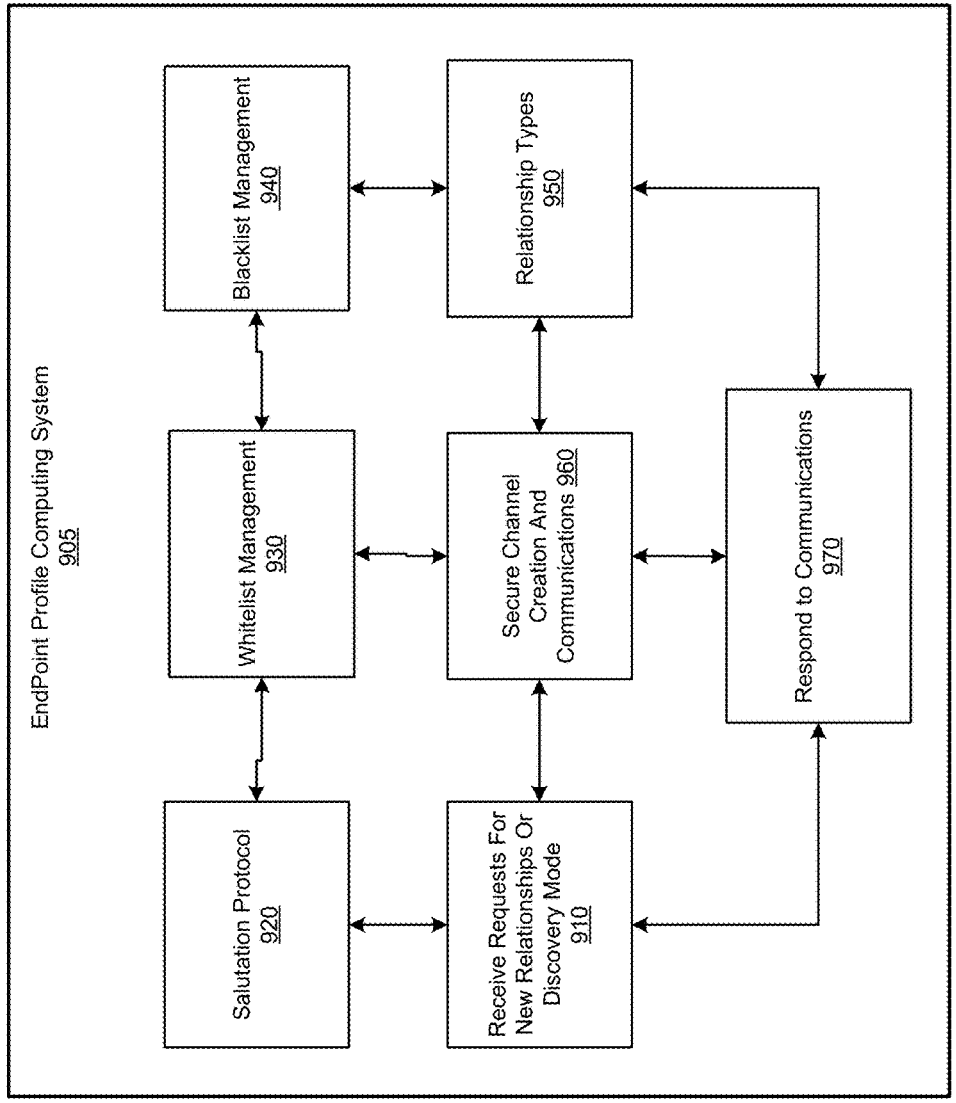
FIG. 9 is an exploded view of an end point profile computing device with different subroutines according to one embodiment.

FIG. 9 shows an exploded view of endpoint object in a computing device according to one embodiment of the proposed solution. The endpoint object uses overlay network architecture to respond to all communications occurring with the private network. In one embodiment, the endpoint object closes all communications outside of the private network. Module 970 is used to receive and respond to communications. These include requests to start a trusted relationship, revoke a relationship or end of a transient relationship. Module 910 receives requests for new relationships or can be put in discovery mode to discovery new relationships. Module 920 implements the exchanges needed for salutation protocol. Module 930 performs whitelist management, i.e., adding, modifying or deleting a whitelist and members of the whitelist. Module 940 performs blacklist management, i.e. adding, modifying or deleting a blacklist and members of the blacklist. The list managements also include customization and sharing or forwarding of portions or all of the lists with their trusted aliases. The whitelists and blacklists collectively form the relationship tables for an alias. Module 950 performs relationship types management. Categorizing the types of aliases into smart devices, owned by family or friends, transient or permanent. Module 960 performs secure channel communications among the trusted relationships that can feed into one or more applications for a user of the alias.

In one embodiment, the private network is implemented using a blockchain platform. The blockchain platform provides different services that are modular, customized and flexible for a given set of users. For example, the blockchain platform provides modular services for authentication, encryption, different applications etc. The private network can pick and choose to modularly work with a blockchain platform to provide additional features and services to its aliases and the end-users.

A person of ordinary skill in the art would understand that the private network can be implemented at personal level as well as for an enterprise. For example, the relationship tables could be configured in a bulk for an enterprise based on on-boarding of a new employee and correspondingly revoked when an employee leaves the enterprise. For example, a hotel offering guest services, includes different features and services based on transient geographic proximity.

A person of ordinary skill in the art would appreciate that communicating through the private networks changes the perspective and use of communicating, freely associating and use of internet. An end-user i.e. owner of a computing device with the use of smart and intelligent aliases has full control on how to associate and communicate with different users.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of modeling a private network communication, comprising:
    associating a secure and encrypted private network with a digital identity of a first profile wherein the private network includes access to content associated with the first profile;
    establishing the private network as an overlay network on an existing public network, or establishing the private network as an overlay peer to peer network;
    allowing access to the private network by other profiles with digital invitation only;
    optionally adding another profile to a blacklist by default when a request to communicate is initiated without a digital invitation;
    sharing the private network communication credentials after authentication of the digital invitation;
    receiving an encrypted digital relationship request from a second profile, a requestor, for the first profile through the private network communication with an embedded temporal key;
    decrypting the temporal key and a digital identity of the requestor;
    sending an authenticated response from the first profile on the digital relationship request and performing one of the following:
        adding the second profile to a whitelist and communicating with the second profile using a secure channel on the private network if it determined that the authenticated response signals an acceptance wherein the secure channel with the second profile does not include a server intermediary; or
        adding the second profile on the blacklist if it is determined that the request is not desired or fails verification.

2. The method of claim 1, wherein the digital invitation includes a signet of the first profile that is shared using one or more of the following: a business card, a posting on a website, broadcast on a public channel, shared with a private group at an event, shared on a social blog, exchanged by email, or digital information transfer.

3. The method of claim 2, wherein the signet includes:
    embedded information to get one or more of the following: an alias, a public key, a network address, or a phone number;

comprises of one or more of the following codes to contain the embedded information: a Quick Response Code, a bar code, a radio frequency identification tag, authentication code using public key, a near field communication code or a digital code; and comprises of one or more of the following formats to encode the embedded information: binary using type-length-value, concise binary object representation, javascript object notation, eXtensible Markup Language or key/value pairs.

4. The method of claim 1, wherein the acceptance types includes one or more of the following:

permanent acceptance, transient acceptance based on geographic location, transient acceptance expiring with a lapse of a time period; or transient acceptance based on selected topics of a conversation.

5. The method of claim 1, wherein the digital invitation is made public to all.

6. The method of claim 1, further comprising:

sending the digital invitation using an out of band network channel.

7. The method of claim 1, wherein the first profile digitally resides on a computing device including one or more of the following: a personal computer, tablet, laptop, handheld device, smart device, or internet of things device.

8. The method of claim 1, further comprising:

sharing the whitelist or portions of the whitelist with another profile.

9. A system of modeling a private network communication, comprising:

a private network comprising of one or more profile computing devices configured to:

associate securely and with encrypted messaging with a digital identity of a first profile wherein the private network includes access to content associated with the first profile;

allow access to the private network by other profiles with digital invitation only;

optionally add another profile to a blacklist by default when a request to communicate is initiated without a digital invitation;

a first profile computing device on the private network configured to:

share the private network communication credentials after authentication of the digital invitation;

establish as an overlay network on an existing public network, or establish as an overlay peer to peer network;

receive an encrypted digital relationship request from a second profile, a requestor, for the first profile through the private network communication with an embedded temporal key;

decrypt the temporal key and a digital identity of the requestor;

send an authenticated response from the first profile on the digital relationship request and performing one of the following:

add the second profile to a whitelist and communicating with the second profile using a secure channel on the private network if it determined that the authenticated response signals an acceptance wherein the secure channel with the second profile does not include a server intermediary; or add the second profile on the blacklist if it is determined that the request is n not desired or fails verification.

10. The system of claim 9, wherein the digital invitation includes a signet of the first profile that is shared using one or more of the following: a business card, a posting on a website, broadcast on a public channel, shared with a private group at an event, shared on a social blog, exchanged by email, or digital information transfer.

11. The system of claim 10, wherein the signet includes:

embedded information to get one or more of the following: an alias, a public key, a network address or a phone number;

comprises of one or more of the following codes to contain the embedded information: a Quick Response Code, a bar code, a radio frequency identification tag, authentication code using public key, a near field communication code or a digital code; and comprises of one or more of the following formats to encode the embedded information: binary using type-length-value, concise binary object representation, javascript object notation, eXtensible Markup Language or key/value pairs.

12. The system of claim 9, wherein the acceptance types includes one or more of the following:

permanent acceptance, transient acceptance based on geographic location, transient acceptance expiring with a lapse of a time period or transient acceptance based on selected topics of a conversation.

13. The system of claim 9, wherein the digital invitation is made public to all.

14. The system of claim 9, wherein the first profile computed device is further configured to:

send the digital invitation using an out of band network channel.

15. The system of claim 9, wherein the first profile computing device including one or more of the following: a personal computer, tablet, laptop, handheld device, smart device, or internet of things device.

16. The system of claim 9, wherein the first profile computing device is further configured to:

share the whitelist or portions of the whitelist with another profile.

* * * * *